US010518203B2

(12) United States Patent
Bonne et al.

(10) Patent No.: US 10,518,203 B2
(45) Date of Patent: Dec. 31, 2019

(54) DEVICE FOR SEPARATING OIL FROM GAS IN THE CRANKCASE OF AN INTERNAL COMBUSTION ENGINE

(71) Applicant: SOGEFI FILTRATION, Guyancourt (FR)

(72) Inventors: Samuel Bonne, La Graverie (FR); Jean-Francois Kientzler, Biltzheim (FR)

(73) Assignee: SOGEFI FILTRATION, Guyancourt (FR)

( * ) Notice: Subject to any disclaimer, the term of this patent is extended or adjusted under 35 U.S.C. 154(b) by 128 days.

(21) Appl. No.: 15/554,750

(22) PCT Filed: Mar. 7, 2016

(86) PCT No.: PCT/FR2016/050522
§ 371 (c)(1),
(2) Date: Aug. 31, 2017

(87) PCT Pub. No.: WO2016/142615
PCT Pub. Date: Sep. 15, 2016

(65) Prior Publication Data
US 2018/0015401 A1 Jan. 18, 2018

(30) Foreign Application Priority Data
Mar. 10, 2015 (FR) .................................. 15 51989

(51) Int. Cl.
B01D 45/08 (2006.01)
F01M 13/04 (2006.01)
F01M 13/00 (2006.01)

(52) U.S. Cl.
CPC ............. B01D 45/08 (2013.01); F01M 13/04 (2013.01); F01M 2013/0044 (2013.01); F01M 2013/0055 (2013.01); F01M 2013/0433 (2013.01)

(58) Field of Classification Search
CPC .................. B01D 45/08; F01M 13/04; F01M 2013/0438; F01M 2013/0433; F01M 2013/0044; F01M 2013/0055
See application file for complete search history.

(56) References Cited

U.S. PATENT DOCUMENTS 7,799,109 B2    9/2010  Dunsch et al.
2003/0075046 A1  4/2003  Lenzing
(Continued)

FOREIGN PATENT DOCUMENTS

JP    S60 84714 U    5/2009
WO   02/32546 A1    4/2002

OTHER PUBLICATIONS

International Search Report, dated Jun. 2, 2016, from corresponding PCT/FR2016/050522 application.

Primary Examiner — Dung H Bui
(74) Attorney, Agent, or Firm — Young & Thompson

(57) ABSTRACT

Disclosed is a device for purifying gas from a crankcase of an internal combustion engine, which includes: a transfer wall having a wall portion with a least one narrow accelerated-distribution opening; one gas-flow deflection wall placed behind the transfer wall and defining an impingement and guide surface; an auxiliary opening separate from the narrow opening, made in the transfer wall; and a bypass valve movable to meet a return member and provided to close the auxiliary opening via closure element for moving closer to the surface, the return member extending in the impingement chamber and having a portion that pushes (Continued)

behind the auxiliary opening in the event of overpressure upstream of the transfer wall.

20 Claims, 6 Drawing Sheets

(56) References Cited

U.S. PATENT DOCUMENTS

| | | | |
|---|---|---|---|
| 2007/0256566 A1* | 11/2007 | Faber | B01D 45/08 |
| | | | 96/417 |
| 2009/0100811 A1 | 4/2009 | Scheckel et al. | |
| 2009/0126324 A1* | 5/2009 | Smith | B01D 46/0002 |
| | | | 55/385.3 |
| 2009/0126575 A1 | 5/2009 | Son et al. | |
| 2010/0300297 A1 | 12/2010 | Ng et al. | |
| 2011/0179755 A1* | 7/2011 | Gruhler | B29C 65/58 |
| | | | 55/320 |
| 2013/0032115 A1 | 2/2013 | Reinz | |

* cited by examiner

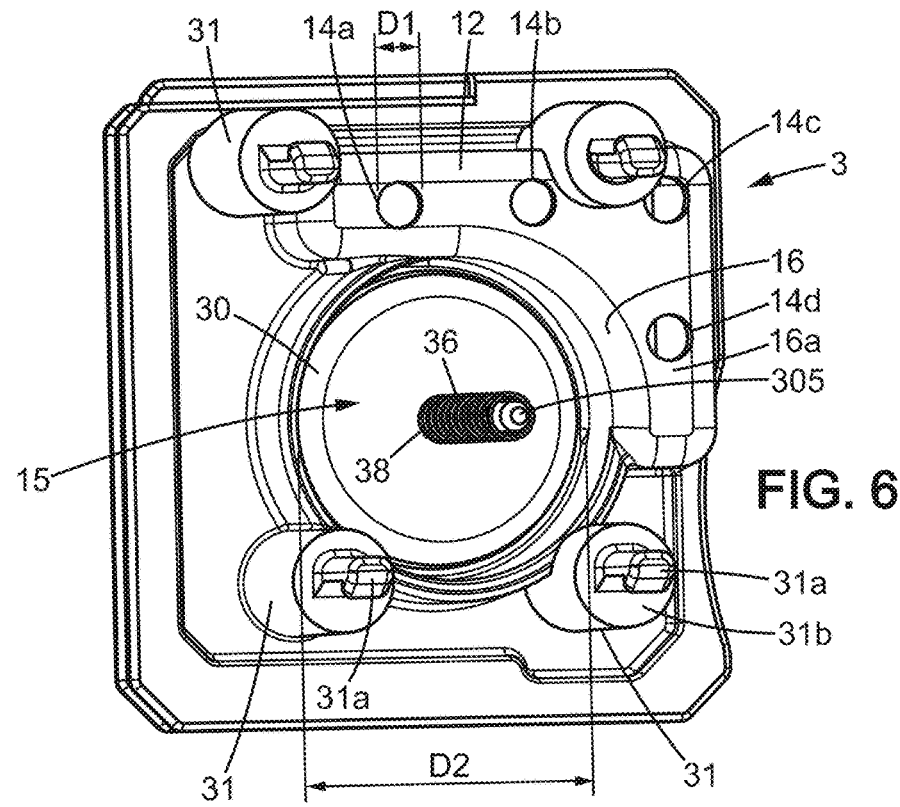
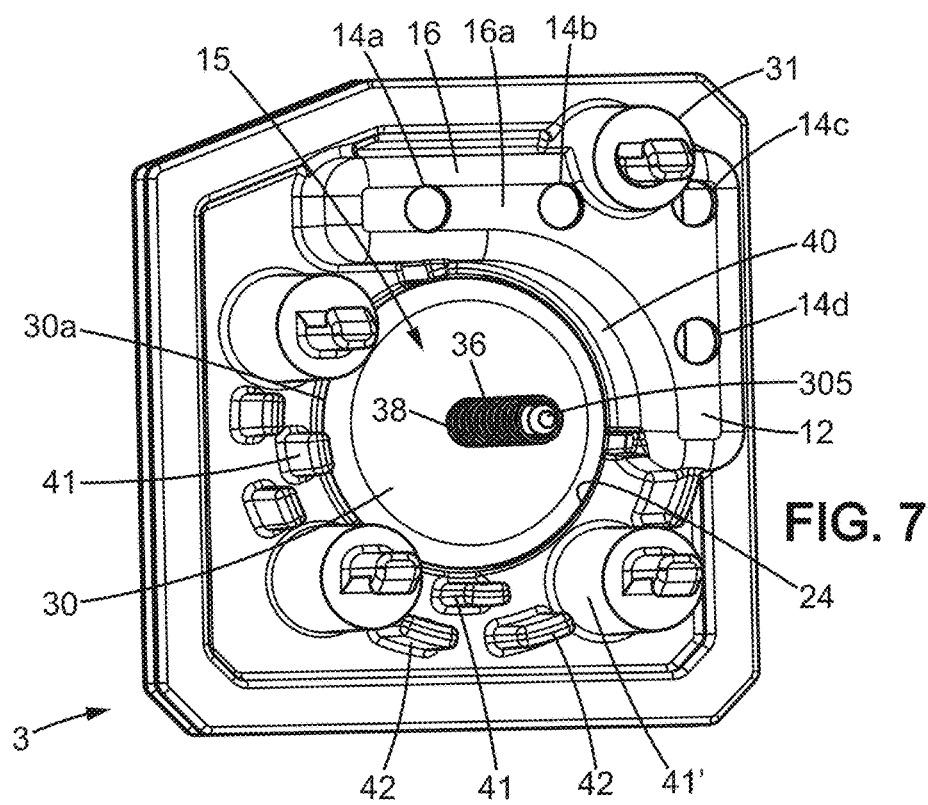

DEVICE FOR SEPARATING OIL FROM GAS IN THE CRANKCASE OF AN INTERNAL COMBUSTION ENGINE

FIELD OF THE INVENTION

The present invention relates to devices for separating particles in suspension in a gas originating from a crankcase of an internal combustion engine. The scope of the invention relates in particular to the separation of oil from crankcase gases in combustion engines for road vehicles (for example cars, trucks, motorcycle) or boats and in industrial combustion engines (engine-generator for example).

BACKGROUND OF THE INVENTION

In known manner, the crankcase is connected to the air intake of the internal combustion engine via a separation device in order to continuously evacuate the crankcase gases and extract the suspended oil. This is what is known to the skilled person as the crankcase gas or blowby gas recycling system. Various means for separating oil from crankcase gases are used in the prior art, among which are cyclones, baffles, or similar systems with multiple changes of direction, centrifugal separators, static coalescers and dynamic coalescers. There are also impingement separator systems. In this latter family, the systems comprise a set of calibrated holes or similar acceleration openings facing an impingement (or collision) plate. The crankcase gases are accelerated when passing through the holes. The oil droplets are thus accelerated and flung against the impingement plate.

In impingement separator systems which have an impingement plate, the oil droplets flung at high speed agglomerate on the surface of the plate to form a film of oil. The speed is then reduced by an enlarged flow area and the oil film drips towards the discharge system. An alternative is to attach a coalescing or similar nonwoven felt on the impingement plate to cause coalescence of the finer oil droplets before they hit the plate. This has the effect of significantly increasing effectiveness in separating the oil mist. Impingement separators offer a better compromise between efficiency/pressure loss than cyclone separators. However, the pressure loss in these systems may be high in cases of increased gas flow rate.

Some systems also include a valve allowing a greater flow rate, sensitive to pressure, in order to partially bypass the acceleration openings made in a transfer wall (wall preceding the impingement plate). The flow rate of crankcase gases is typically higher at the end of a separators service life (for example double or triple the nominal flow for a new engine).

Solutions that allow increasing the flow rate are therefore of interest in order to limit the pressure loss at the transfer wall. For example, FIGS. 2a-2c of U.S. Pat. No. 7,799,109 show a transfer wall placed facing an impingement plate and provided with a plurality of openings for accelerating the flow of blow-by gas. A valve of flexible material is provided which is deformed to define an auxiliary opening of large cross section when a pressure threshold (overpressure) is reached upstream of the transfer wall.

This type of solution has limitations, however, notably because of the temperature sensitivity of the flexible material and because, even at low flow rates, the valves may have a slightly open state (the closure being progressive). Poor separation performance may then be observed, especially during transition phases. In addition, a closure portion of flexible material can often wear out quickly (risk of wear).

There is therefore a need for an efficient separation of oil from crankcase gases by impingement (the ultimate purpose being to improve engine durability), while taking into account flow rate variations over time.

Known from document US2013/0032115 A1 is the use of non-hermetic valves which have openings formed in the movable element (partial closure element). Regardless of the position of the valve, the gases circulate in a region behind the valve where a coil spring is placed. This type of valve has stability problems in an environment that is generally subject to vibration. In some embodiments (see FIGS. 8 and 9 of US2013/0032115 A1) it is arranged to guide the closure element in order to stabilize the valve. In this case, it is necessary to provide a complex seating of at least two parts and there is more friction between the valve and the transfer wall, which subjects this system to premature wear or makes it less effective.

OBJECTS OF THE INVENTION

The present invention aims to overcome one or more of the above disadvantages by providing a device for removing the oil from gases originating from a crankcase, which remains simple in design and is simple to integrate while offering a good compromise between pressure loss and separation efficiency.

To this end, the invention relates to a device for purifying gas from a crankcase of an internal combustion engine, intended to be interposed between a blow-by gas inlet and a purified gas outlet, comprising a separation section for separating oil from the gas flow, this separation section comprising:

a transfer wall which comprises a stationary wall portion having at least one accelerated distribution opening, preferably a plurality of accelerated distribution openings, allowing the gas flowing in the inlet to pass through the transfer wall;

a gas-flow deflection wall positioned in an area of passage for at least one gas flow having passed through said at least one accelerated distribution opening;

an auxiliary opening separate from the accelerated distribution opening or openings made in the transfer wall; the device comprising a valve biased by a return member towards a closed position so as to close the auxiliary opening, the valve comprising a movable closure element, the return member being configured to allow all or part of the closure element to approach an oil guiding surface of the deflection wall in case of overpressure at the inlet side, preferably such that the closure element is in a position away from the transfer wall.

With this arrangement, the auxiliary opening (wider than the narrow openings for the accelerated distribution) defines a passage bypassing the accelerated distribution opening or openings in case of overpressure at the inlet side. The return member allows reliable and repeatable closure of the low-flow auxiliary opening. In addition, the closure element and oil guiding surface (impingement and guiding surface) positioned close together define a bypass that lengthens the travel distance by very little or not at all in comparison to the gas flow through the accelerated distribution openings. A more compact device can thus be obtained. The guiding surface of the deflection wall typically extends to a lower edge and uses gravity to guide the oil to an oil drainage line.

The return member is preferably arranged in an area behind the auxiliary opening, on the deflection wall side. The return member comprises one or more connection portions connected to one among the deflection wall and the stationary wall portion, the return member further comprising at least one end integral to the closure element. The return function may be obtained by an elastic return structure, a structure of magnetic repulsion between two complementary members, or by another functionally similar structure. Preferably, the return member extends between two connection points: one with the closure element which closes off the auxiliary opening from the rear, and the other with the deflection wall. With this arrangement, it is possible to obtain a particularly stable valve (despite an environment subjected to many vibrations) and thus improves the closure of the auxiliary opening.

According to one feature, the closure element has a larger cross-section than the flow area defined by the auxiliary opening, in order to hermetically seal the auxiliary opening in a state where it bears against a valve seat, the valve seat preferably being defined by an annular region bordering the auxiliary opening. It is understood that the closure element can be defined by an unpierced element.

According to one feature, the transfer wall is adapted for directing towards the deflection wall, in a single general direction of flow, the blow-by gas arriving through the inlet (direction defined at least in the no-overpressure configuration). The deflection wall extends crosswise to this single general direction of flow of loaded gas. In this case, the transfer wall (which is typically in the form of a non-annular plate) can be simple in design and mounted simultaneously with the deflection wall in a line of a cylinder head cover. It is understood that the respective openings made through the transfer wall thus define directions of flow with a same general orientation towards the guiding surface of the deflection wall, which is not the case for example with a cylindrical wall having openings allowing a centrifugal flow of gas in different directions.

According to one feature, the device comprises the inlet and the closure element extends parallel to the stationary wall portion and has an annular edge, the valve preferably comprising a rod which extends perpendicularly to the stationary wall portion, opposite the inlet, from an inner face of the closure element. It is understood that the closure element bears on the periphery of the auxiliary opening which defines a valve seat. The valve may advantageously be guided by the rod. More generally, it is understood that the valve is a check valve and is movable by a thrust directed towards the deflection wall.

As indicated by the term "stationary", it is understood that the wall with the passages is neither movable nor deformable, so that the accelerated distribution opening(s) have a (calibrated) size and shape that are predetermined independently of the variations in pressure or temperature conditions in the cylinder head cover area or similar area for integration of the device.

In a preferred embodiment, the separation section comprises at least one baffle extending at the periphery of the closure element so as to direct towards the deflection wall, in the position of the closure element that is distanced from the seat, all or part of the flow of loaded gas passing between a boundary edge of the auxiliary opening and the annular edge. This arrangement allows the separation of oil from flows bypassing the narrow openings, by impingement on the deflection wall.

In various embodiments of the device for purifying crankcase gases according to the invention, at least one of the following arrangements may possibly be used:

The baffle is integrally formed with the stationary wall portion and preferably has a plurality of projections which protrude parallel to a central axis of the auxiliary opening.

The projections are configured in two sets, so as to define first baffles radially closest to the annular edge and second baffles radially furthest from the annular edge, said first and second baffles being arranged so as to alternate.

The return member is an elastic return member, located entirely between the transfer wall and the deflection wall or extending to an end positioned further rearward than the oil guiding surface (a mounting on the rear side, in the impingement chamber, allows repeatability in obtaining the same closure configuration and provides very good valve stability despite the engine vibrations; in options with translation of the closure element, it is advantageous for stability to form a housing in a sufficiently long guide channel, which preferably extends further back than the impingement area).

The separation section further comprises at least one outlet section on the deflection wall side, which opens into an oil discharge channel, the outlet section being defined by an end edge of the deflection wall which extends between two opposite and distanced ends of the deflection wall.

The gas-flow deflection wall is in the form of an impingement plate which extends parallel to the stationary wall portion, an inner space being defined between the transfer wall and the deflection wall.

The valve is guided in translation in a housing receiving one end of the return member, the housing being secured to or formed by the impingement plate.

The deflection wall comprises a smooth or ribbed plate, preferably covered with coalescing media on the inner space side.

The deflection wall is covered with nonwoven media on the inner space side.

A plurality of accelerated distribution openings are provided in the stationary wall portion, the auxiliary opening being oval, oblong, or circular and defining a maximum diameter D2, the following relation being satisfied:

$$D2/D1 > 4.5$$

where D1 represents a maximum diameter of one of the accelerated distribution openings.

The closure element bears against an inner annular face of the transfer wall (this face thus facing the deflection wall and extending at a first distance from the deflection wall), the stationary wall portion being arranged at the end of a projection which protrudes toward the deflection wall from the inner annular face, such that the accelerated distribution opening extends at a second distance, less than the first distance, from the deflection wall.

The transfer wall also comprises an auxiliary accelerated distribution channel, preferably parallel to a central axis of the auxiliary opening, which extends through the transfer wall between a first end defining an access opening and a second deformable end facing the deflection wall, the second deformable end being adapted to define a flow area that increases in size due to deformation of the second end when the alas flow rate increases in the inlet (with this type of distribution, one can combine two different methods of gradually increasing the flow rate, in the same transfer wall which is typically flat).

At least one among the transfer wall and the deflection wall comprises attachment members distributed around the auxiliary opening and extending parallel to a central axis of the auxiliary opening, in order to maintain a predetermined spacing between the transfer wall and the deflection wall, at least one of the attachment members traversing a layer defined by a fibrous material, preferably a nonwoven material.

BRIEF DESCRIPTION OF DRAWINGS

Other features and advantages of the invention will be apparent from the following description of several embodiments, given as non-limiting examples, with reference to the accompanying drawings in which:

FIGS. 6 and 7 are perspective views respectively showing two embodiments of the transfer wall;

DESCRIPTION OF PREFERRED
EMBODIMENTS OF THE INVENTION

In the various figures, identical references indicate identical or similar elements.

Figure 2:
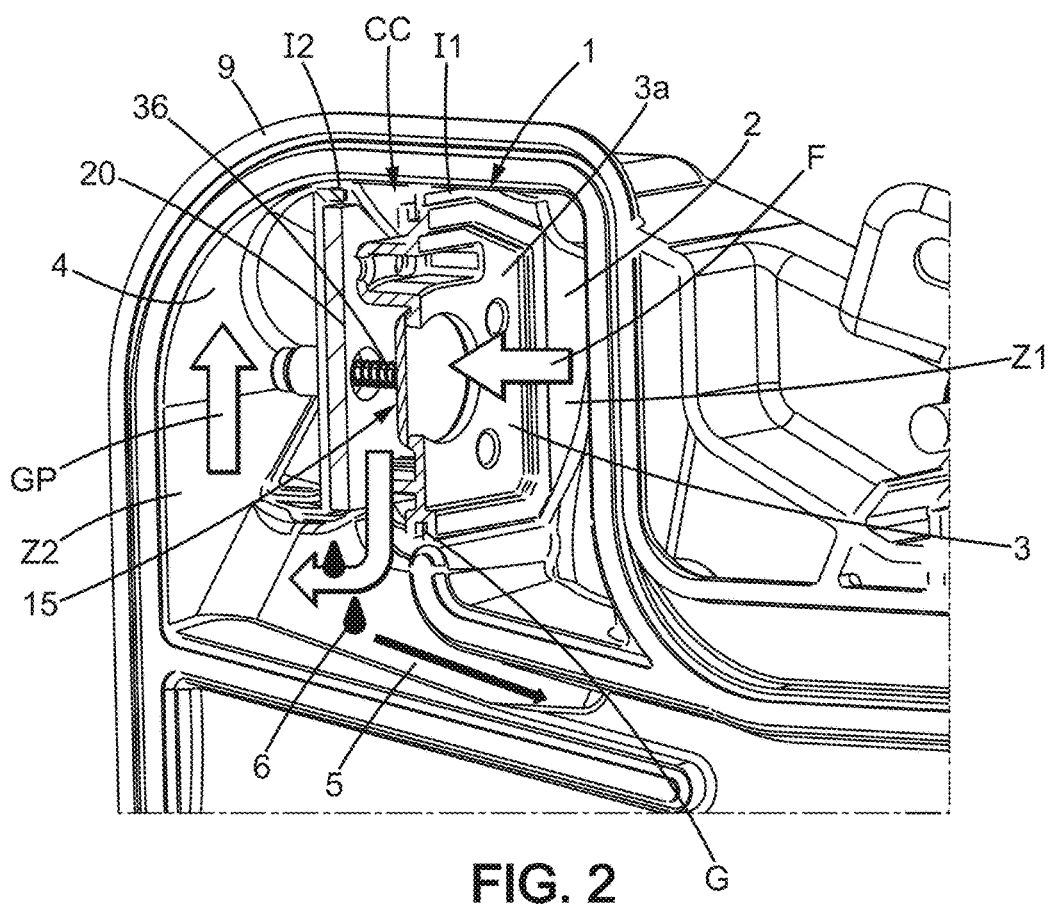
FIG. 2 is a perspective view of the separation device of FIG. 1, illustrating an exemplary integration in a cylinder head cover.

Referring to FIG. 2, the separation device 1 serves to separate liquid (and possibly solid) components from gases originating from the crankcase of an internal combustion engine and which come directly from the crankcase. An inlet 2 for oil-loaded gas can extend to an outer face 3a of a transfer wall 3 that is part of the separation device 1. The separation device 1 is typically part of an engine sub-assembly with a connection back to the air intake. A purified gas discharge line 4 is formed in this sub-assembly, here at a level at least as high as the transfer wall 3. The line 4 is preferably directly connected to the connection which rejoins the air intake. At a level that is typically lower than the transfer wall 3, downstream of the transfer wall 3, a channel 5 for discharging the separated oil 6 is provided.

By way of non-limiting example, the separation device 1 may be located in a line CC of a cylinder head cover, in a motor vehicle. The separation device 1 has, between the inlet 2 and the line 4, a separation section 8 for extracting oil from the gas flow F supplied by the inlet 2.

Figure 1:
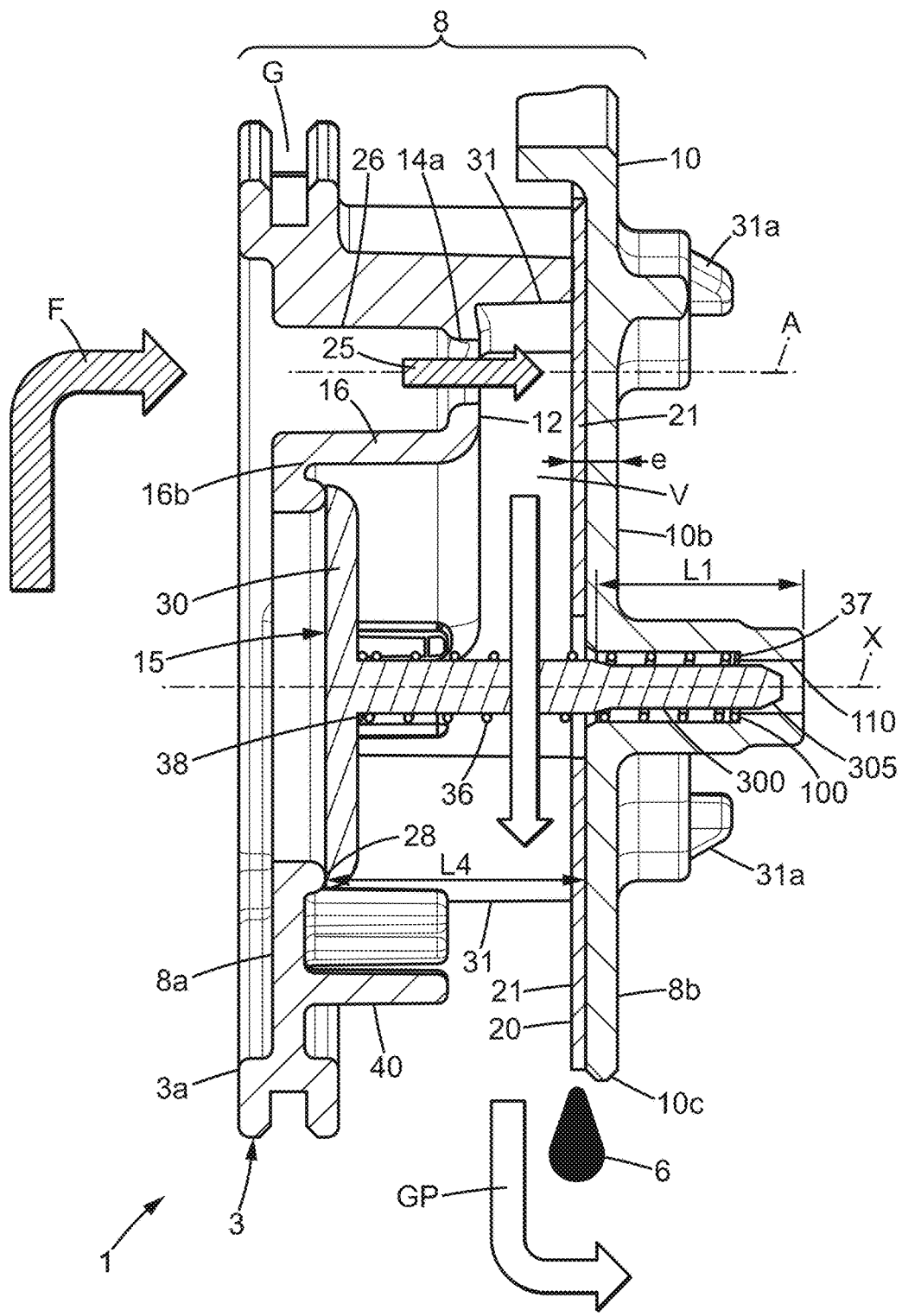
FIG. 1 is a vertical sectional view of the separation device according to a first embodiment of the invention.
Figure 5:
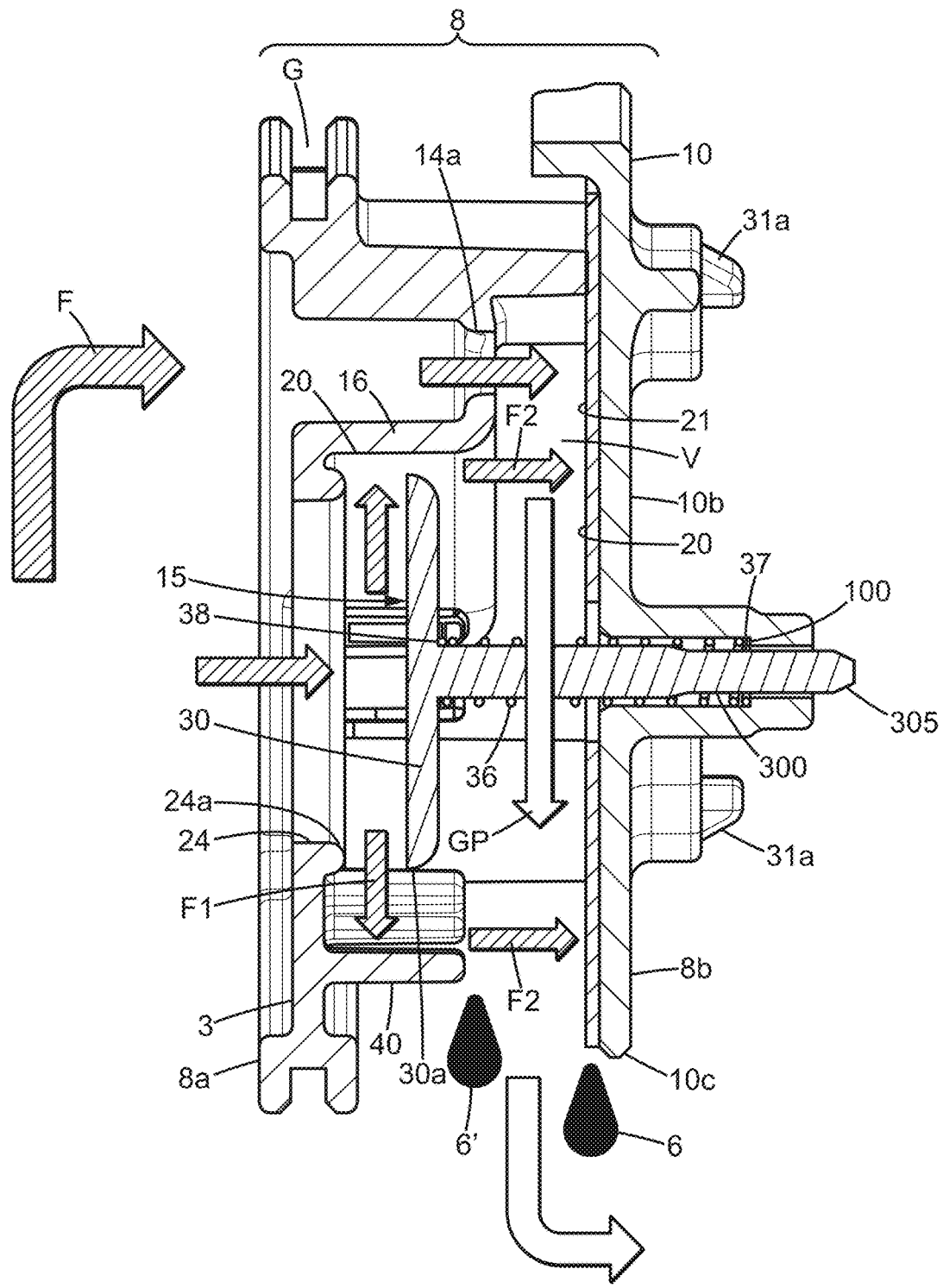
FIG. 5 is a view that differs from FIG. 1 in that the valve is in its withdrawn (rearward) position due to overpressure.
Figure 9:
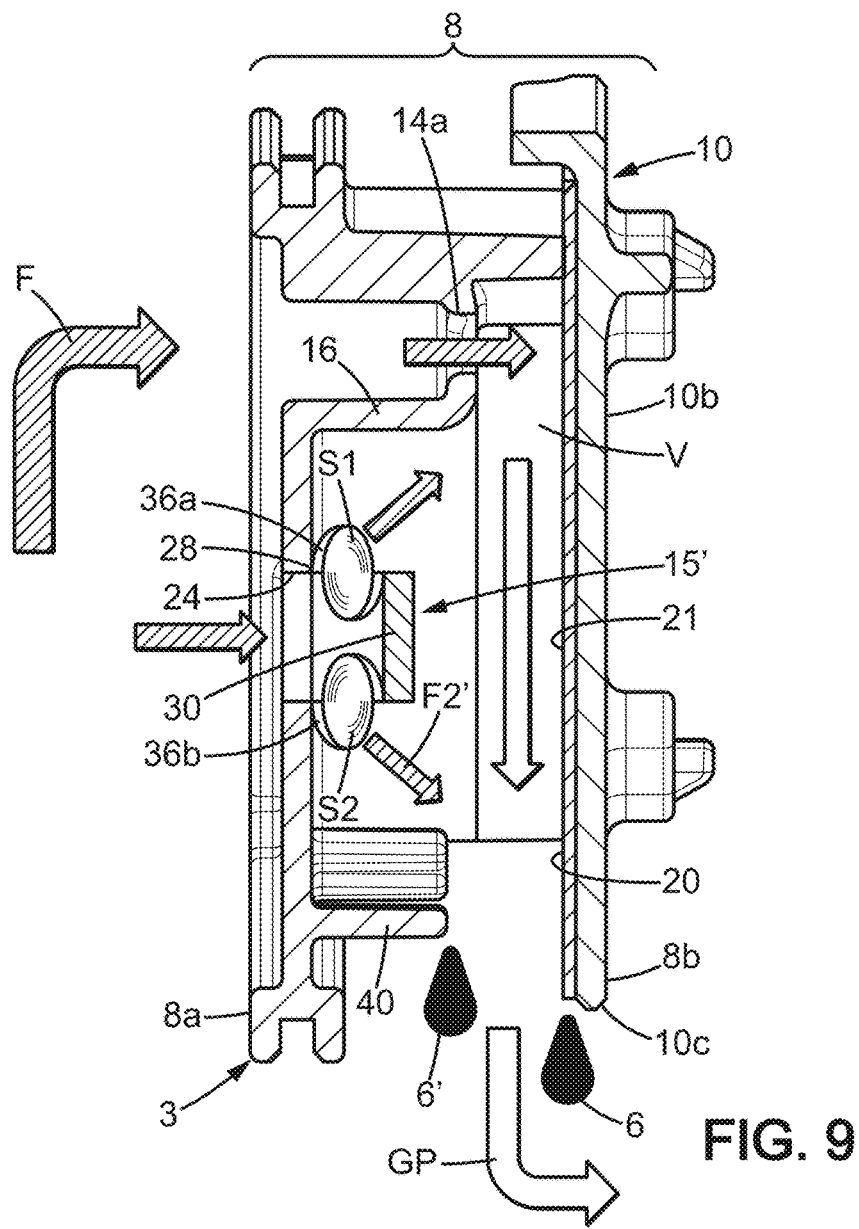
FIG. 9 shows a view similar to that of FIG. 5, showing the effect of overpressure on the valve of FIG. 8.

As can be clearly seen in FIGS. 1, 5, and 9, the separation section 8 comprises:
- the transfer wall 3 which here defines a first end 8a of the separation section 8, the outer face 3a defining an area Z1 upstream of the separation;
- a gas-flow deflection wall 10, which here defines a second end 8b of the separation section 8, an outer face 10b (opposite to the transfer wall 3) and/or an outer edge 10c of the deflection wall 10 defining an area Z2 downstream of the separation.

The transfer wall 3 comprises a stationary wall portion 12 having at least one accelerated distribution opening 14a, and preferably several accelerated distribution openings 14a, 14b, 14c, 14d, allowing the gas flowing in the inlet 2 to traverse the transfer wall 3. An acceleration effect is achieved due to the small flow area of these openings 14a, 14b, 14c, 14d in comparison to the flow area of the outer face 3a of the transfer wall 3. The general direction of flow on the outlet side of the openings 14a, 14b, 14c, 14d may be substantially the same, as illustrated by arrow 25 in FIG. 1 (single direction of orientation in the absence of overpressure).

With reference to FIGS. 1 and 6-7, the transfer wall 3 allows orienting, in a single general direction of flow, the loaded gas arriving through the inlet 2. In this example, the stationary wall portion 12 is placed at the end 16a of a projection 16 which protrudes toward the deflection wall from the inner annular face. The stationary wall portion 12 is placed at the end 16a so as to define a face which is substantially flat and close to the deflection wall 10. It is understood that the deflection wall 10 extends crosswise relative to the single general direction of flow of the loaded gas. In this non-limiting option, the deflection wall 10 extends perpendicularly to a longitudinal axis A defined by the projection 16 and possibly parallel to the stationary wall portion 12.

More generally, the deflection wall 10 is placed in an area of passage for at least one gas flow having passed through one or more accelerated distribution openings 14b, 14c, 14d formed in the transfer wall. Impingement on the deflection wall 10 enables the separation of oil droplets 6, which then flow due to gravity to the discharge channel 5. The deflection wall 10 is for example in the form of an impingement plate (possibly resulting from an assembly of multiple plates), which extends parallel to the stationary wall portion 12.

At least one outlet section is provided on the lower side of the deflection wall 10 to avoid any lasting retention of oil within the inner space V along the oil guiding surface 20. The output section of the separation section 8 leads to the channel 5, as can be clearly seen in FIG. 2. The output section may be defined by the edge 10c extending between two opposite and distanced ends 17a, 17b (see FIG. 4) of the deflection wall 10. The edge 10c may be longer than the opposite upper edge 10d (see FIG. 4 in particular), so that the output section is a section that is typically wider in comparison to the distribution area of the accelerated distribution openings 14a, 14b, 14c, 14d. This slows down the flow at the outlet section and reduces turbulence (minimizing the risk of entraining oil droplets 6 to the gas discharge line 4).

Within the inner space V defined between the transfer wall 3 and the deflection wall 10, the loaded gas passing through openings 14b, 14c, 14d is directed onto an oil guiding surface 20 of the deflection wall 10, here in a substantially horizontal direction. This inner space V therefore corresponds to an impingement chamber, with no intermediate partition between the transfer wall 3 and the deflection wall 10. The surface 20 extends downward here, preferably vertically, to a lower edge defined by the outer edge 10c. This surface 20 allows the oil to be guided by gravity. Media allowing the oil droplets to enlarge by coalescence or any other suitable porous media may be part of the deflection wall 10, defining the guide surface 20. It is understood that the deflection wall 10 may thus include nonwoven media 21 on the inner space V side. In some embodiment options, the deflection wall 10 comprises a smooth or ribbed plate, preferably covered with nonwoven coalescing media 21 on the inner space V side. Of course, options without media in the deflection wall 10 may also be suitable.

Referring to FIG. 2, the separation section 8 forms a boundary between the upstream area Z1 of untreated gas F in communication with the engine crankcase, and the downstream area Z2 of treated gas GP in communication with the outlet via the line 4. The untreated gas F loaded with oil mist entering the separation device 1 via the inlet 2 hits the deflection wall 10, with impingement for the liquid phase, and exits from the lower side of the separation section 8, here by traversing the nonwoven media 21 or similar media. Inside the media 21, it is understood that the oil droplets 6 in contact with the fibers of the media 21 join together to form larger drops which are then pushed by the gas flow and gravity towards the lower area with the channel 5. Media 21 provided with such fibers thus perform a coalescence function for the oil.

The treated gas GP is guided to a passage, here defined by the line 4, which diverges from the path of the oil droplets 6 in order to protect against oil splashes on a lower face located directly above the lower edge 10c.

When the separation section 8 is integrally secured to a cylinder head cover 9 of an internal combustion engine, the transfer wall 3 can be mounted in the head cover 9 so as to form a fluidtight barrier which prevents the return, into the inlet 2, of gas redirected due to impingement against the deflection wall 10. In particular, the peripheral edge of the assembly or single piece forming the transfer wall 3 can be fixed to a first assembly interface I1 which forms a first frame without leaving a bypass. A peripheral annular groove G can thus be defined to engage with the first interface I1.

For the deflection wall 10, it can be defined by an impingement plate having more than half its circumference continuously fixed in a sealed manner to a second assembly interface I2. The remaining portion of the edge corresponds in particular to the outer edge 10c and extends to a distance from a bottom allowing the flow of oil droplets 6, 6' where the channel inlet 5 may be formed.

Figure 3:
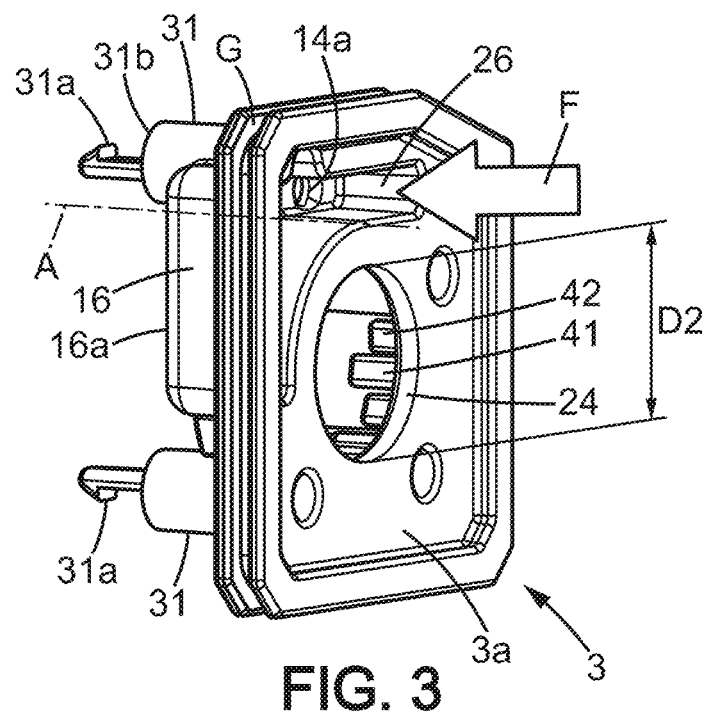
FIGS. 3 and 4 show the constituent elements of the separation device, in an embodiment with a direct connection between the deflection wall and the transfer wall.
Figure 4:
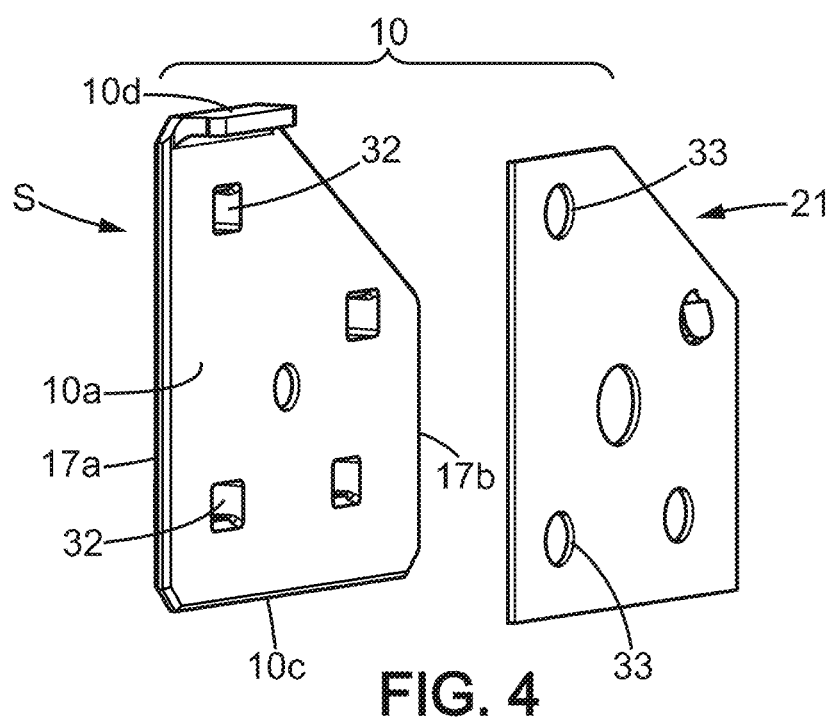

Referring to FIGS. 3 and 4, one can see that the separation section 8 can be the result of assembling three elements, here parallel (which then each extend perpendicularly to the single orientation defined by the opening or openings 14a, 14b, 14c, 14d);
  the transfer wall 3, which may be rigid and obtained by molding a plastic or composite material;
  a support S such as an impingement plate, of rigid plastic and/or optionally another rigid and lightweight material (for example aluminum), defining a non-deformable rear layer of the deflection wall 10 in the assembled configuration of the separation section 8;
  an optional component such as a fibrous nonwoven media 21, formed as a plate or other shape matching the shape of the support S.

At least one among the transfer wall 3 and the deflection wall 10 comprises attachment members 31, 32 distributed around the auxiliary opening 24 and extending parallel to a central axis X of the auxiliary opening 24, in order to maintain a predetermined spacing between the transfer wall 3 and the deflection wall 10. In the example illustrated, at least one of the attachment members 31, 32 is defined by a male member 31 extending from the inner face of the transfer wall 3 and passing through the layer defined by the optional element. Preferably, the nonwoven media 21 which constitutes the optional element has one or more predefined orifices 33 allowing the passage of male members 31 without damage to the nonwoven media 21 or similar material.

The support S has cavities 32 configured to guide and lock the male members 31. Retaining lugs 31a are for example formed on the free end side of these male members 31, to lock the assembled position of transfer wall 3 and deflection wall 10. When nonwoven media 21 is used, the male members 31 may have an axial shoulder 31b which abuts against the surface of the nonwoven media 21 opposite to the support S. This holds the nonwoven media 21 in place against the support 5, with no need for bonding. Assembly is simple, particularly because the transfer wall 3 is a molded plastic part that incorporates the male members 31 and can be attached quickly by snap-fitting onto the support S.

An auxiliary opening 24 provided in the transfer wall 3 and an exemplary associated valve 15 responsive to overpressure on the upstream side will now be described with reference to FIGS. 1 to 3 and 5-6.

The auxiliary opening 24, separate from the accelerated distribution opening or openings 14a, 14b, 14c, 14d, is formed in the transfer wall 3 and has a wider cross-section than any of openings 14a, 14b, 14c, 14d. Without it being limiting, this cross-section may be oval, oblong, or circular, and a maximum diameter D2 may be defined by the auxiliary opening 24, as is clearly visible in FIG. 3. The valve 15 has a closure element 30 having a cross-section greater than the cross-section defined by the auxiliary opening 24, preferably with an outer shape similar to its annular edge 30a. The seat of the valve 15 is here defined by an inner annular face 28 (see FIG. 1) of the transfer wall 3. Although the opening 24 here is closed by a closure element 30 implemented as one piece, a comparable closure element 30 can also be obtained by assembling multiple parts.

The closure element 30, which extends into the inner space V, is supported on a continuous annular seat area of this inner annular face 28. It is understood that this seat area may be further away from the deflection wall 10 than the end 16a of the projection 16. The closure element 30 is movable and a return member 36, which here has a fixed end 37 mounted to be integral with the deflection wall 10, biases the valve 15 to a closed position where the closure element 30 closes the auxiliary opening 24 (complete closure in practice, in the absence of overpressure at the upstream area Z1 side). As is clearly visible in FIG. 1, the closure element 30 may optionally extend parallel to the transfer wall 3. The return member 36 is preferably placed entirely rearward relative to the auxiliary opening 24.

In the example illustrated, while a guide track 26 can be defined parallel to the longitudinal axis A in the hollow portion of the projection 16, to allow the openings 14a, 14b, 14c, 14d to be closer to the deflection wall 10, auxiliary opening 24 may be defined at substantially the same level as the base 16b of the projection 16. Auxiliary opening 24 may be placed centrally in the transfer wall 3, at a greater radial distance from the groove G or similar periphery than any longitudinal axis of the passage of the openings 14a, 14b, 14c, 14d.

It is understood here that there is longitudinal guidance for the loaded gas (gas-liquid mixture) on the upstream side of the transfer wall 3 for flows through openings 14a, 14b, 14c, 14d, which are smaller, while there is (preferably) no longitudinal guidance before the passage through the auxiliary opening 24.

Such a configuration, with more space in the inner space V between auxiliary opening 24 and the deflection wall 10 (in comparison to the space at the accelerated distribution openings 14*a*, 14*b*, 14*c*, 14*d*), enables the placement of one or more baffles 40, 41, 42 at the periphery of the closure element 30. Here, a side wall portion of the projection 16 defines all or part of a first baffle 40, which optionally may continuously surround the closure element 30, with a little spacing.

It is understood that the deflection wall 10, here provided with nonwoven media 21, may extend in a planar manner both facing the accelerated distribution opening(s) 14*a*, 14*b*, 14 and facing the auxiliary opening 24. The return member 36 is typically surrounded by the first baffle 40 and the possible additional baffles, which allows directing and recentering the flow admitted through the auxiliary opening 24 toward the deflection wall 10 as illustrated by the arrows F2 in FIG. 5, limiting the radial component of this flow. After impingement, a downward flow of gas relieved of particles is directed towards the exit.

By comparing FIG. 1 and FIG. 5, one will understand that opening the valve 15 corresponds to a bypass function. Indeed, in case of overpressure in the flow F of untreated gas supplied through the inlet 2, the spring or similar element which here defines the return member 36 is compressed with respect to its default position shown in FIG. 1, thereby defining a larger flow area for the untreated gas F. In other words, the auxiliary opening 24 defines a bypass around the accelerated distribution opening(s) 14*a*, 14*b*, 14*c*, 14*d* in case of overpressure at the inlet 2 side. For example, a spring with constant K greater than 0.06 N/mm may be used. A rest length of approximately 20 mm may be suitable in this non-limiting case, in order to gain compactness.

More generally, the return member 36 is configured to allow all or part of the closure element 30 to move closer to the guiding surface 20 in case of overpressure at the inlet 2 side, preferably so that the closure element 30 occupies a position away from the transfer wall 3. The fixed end 37 here bears against a shoulder or similar abutment 100 formed in a housing 110 defined by a recess or a through passage in the support S or similar rigid rear layer of the deflection wall 10.

The return member 36 here biases the closure element 30 towards the closed position. The return member 36 here is a spring extending parallel to the central axis X, from the fixed end 37 to a movable end 38 which the closure element 30 or a slidingly integral projection bears against. The spring surrounds a rod 300 that extends from the closure element 30 (planar here) to the free end 305, as is clearly visible in FIGS. 1 and 5. The free end 305 slides rearward through the housing 110 when the closure element 30 moves away from the auxiliary opening 24. In case of overpressure of the untreated gas F, it is understood that the pressurized flow can push the movable end 38 (which is mounted to be integral with the closure element 30) rearward. The closure element 30 is actuated and thus moves in a manner comparable to a pushbutton, in the same direction as the orientation of the gas in a configuration without overpressure.

The housing 110 is defined by a tubular face which guides the valve 15 as it slides. More generally, it is understood that the valve 15 is guided in translation in a housing 110 receiving preferably a fixed end 37 of the return member 36. The housing 110 may be formed in a part integrally attached to the support S which here is formed by the impingement plate.

As can be seen in FIG. 1, the length L1 of this housing 110 is much greater than the minimum thickness e of the deflection wall 10, thereby stabilizing the valve 15. The guidance parallel to the central axis X allows maintaining the orientation of the valve 15 despite engine vibrations. In one non-limiting embodiment, the length L1 exceeds a fifth, and preferably a quarter, of the distance L4 measured longitudinally between auxiliary opening 24 and the mouth of the housing 110 connecting to the inner space V. Preferably, length L1 can be less than or equal to distance L4 and/or the sum L1+L4 can be less than 80 or 110 mm, preferably less than or equal to 30 or 40 mm, which in practice provides very good compactness for the separation device 1. In the example represented here, the sum L1+L4 is about 20 mm.

Referring to FIG. 6, one will also note that the diameter D2 of the auxiliary opening 4 is typically at least equal to one third of the largest dimension of the transfer wall 3, optionally without this diameter D2 exceeding a threshold of 100 mm, and preferably a threshold of 60 mm. The auxiliary opening 24 can be closed by a surface area of the closure element that is greater than or equal to 120 mm$^2$. These parameters can of course change, particularly depending on the space available in the impingement chamber. However, it is preferable that the characteristic dimension of the auxiliary opening 24 remains much larger than the size (here, diameter D1) of the openings 14*a*, 14*b*, 14*c*, 14*d*, which define a flow area for example that is less than or equal to 10 or 20 mm$^2$.

If one also considers that D1 represents the maximum diameter of one of the accelerated distribution openings 14*a*, 14*b*, 14*c*, 14*d*, the following relation can typically be satisfied:

$$D2/D1 > 4.5$$

The closure element 30, which may be planar, here extends parallel to the stationary wall portion 12 in which are provided the one or more accelerated distribution openings 14*a*, 14*b*, 14*c*, 14*d*. When the valve 15 has a rod 300 received in a housing 110 of fixed guiding orientation, the rod 300 may extend perpendicularly to the stationary wall portion 12.

Although the example illustrated in FIG. 1 shows an axis of the rod 300 which is close to or coincides with the central axis X of the auxiliary opening 24, an offset assembly can also fulfill the same return function, holding the closure element in its default position pressed against the inner annular face 28. Thus, the rod 300 can also extend opposite the inlet 2, not from a central portion of the inner face of the closure element 30 but from an area near the edge.

Furthermore, the biasing effect may alternately be obtained by an elastic blade and/or by magnetic coupling (possibility of having forces of attraction or repulsion in a longitudinal or radial direction). In an option with magnetic attraction by forces in a radial direction, one can use at least one first magnetic member integrated in the movable annular edge 30*a* and at least one second fixed magnetic member integral to the transfer wall 3 and biasing the closure element 30 towards the closed position. In an option with magnetic repulsion in a longitudinal direction, it is sufficient to place two poles of the same nature facing one another. The rod 300 (without spring) and the associated housing 110 may possibly be preserved for the last two options, where appropriate with an abutment or shoulder 100 restricting the backward stroke of the valve 15, which ensures good mechanical stability.

Referring to FIG. 6, one can see that a single baffle 40 of annular shape can define an impingement surface for part of the flow F of untreated gas entering the inner space V by the auxiliary opening 24 due to overpressure. In this case, the baffle 40 and the stationary wall portion 12 can be integral (formed as one part typically of plastic or aluminum).

In the variant embodiment of FIG. 7, the baffle 40 is only defined by the projection 16 and thus only extends facing a portion of the closure element 30, which represents between one third and one fifth of the full circumference of the closure element 30. Optionally, there is provided a plurality of baffles 41, 42, defined by projections protruding parallel to the central axis X of the auxiliary opening 24, which coincides in this non-limiting example with the axis of the rod 300. More generally, a configuration with alternating baffles 41, 42 around the circumference of the closure element 30, with a difference in proximity between the sets of baffles, presents a significant advantage in limiting pressure losses while maintaining the effect of redirecting the gas flow toward the deflection wall 10.

All or part of the projections can be configured into two sets, with first projections defining baffles 40, 41, 41' radially closer to the annular edge 30a, and second projections defining baffles 42 radially further away from the annular edge 30a. Here, baffles 40, 41 and baffles 42 alternate along a circumferential region of the auxiliary opening 24.

More generally, it is understood that the separation section 8 comprises at least one baffle 40, 41, 41', 42 extending along the periphery of the closure element 30 in order to limit diverging directions of flow and to direct towards the deflection wall 10 all or part of the loaded gas flow passing between a boundary edge 24a of the auxiliary opening 24 and the annular edge 30a.

Arrows F1, F2 of FIG. 5 schematically illustrate the directions taken by the loaded gas when the closure element 30 is in the position away from the transfer wall 3 (under the effect of overpressure which pushes the closure element against one or more return members 36). Oil droplets 6' are collected from some of the gases passing through the auxiliary opening 24 without requiring impingement against the deflection wall 10. Such oil droplets 6' result from impingement with the baffle or baffles 40, 41, 41', 42.

In addition, the guiding function of the baffles 40, 41, 41', 42 can also help direct the flow of loaded gas (partially relieved of oil by impingement against the baffles 40, 41, 41', 42) in the same general direction as is obtained through the accelerated distribution opening or openings 14a, 14b, 14c, 14d, as shown by the arrows F2. The impingement against the deflection wall 10, here preferably against the plate of nonwoven media 21, allows separating the oil droplets 6 which fall vertically while being guided by the guiding surface 20. A double impingement effect can thus be obtained without requiring an intermediate partition with other distribution openings.

As illustrated in FIG. 2, the inner space V communicates with the discharge channel 5 for the separated oil 6, at a lower end of the separation section 8. Although the accelerated distribution openings 14a, 14b, 14c, 14d here are represented in a position opposite the lower end of the separation section 8, preferably above a central axis of the auxiliary opening 24, it is understood that the openings 14a, 14b, 14c, 14d may be positioned otherwise while maintaining the same type of valve 15.

Figure 8:
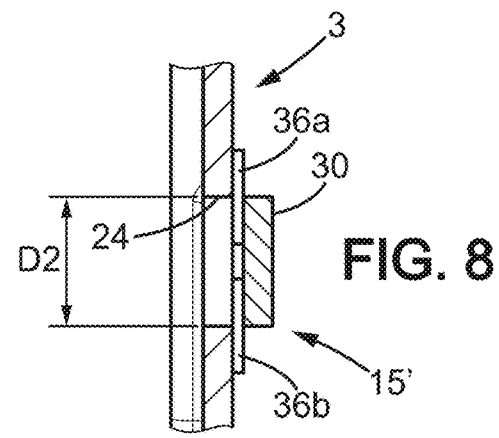
FIG. 8 shows, in a closed configuration, a valve variant which is located behind an auxiliary opening and has a smaller footprint.

An alternative embodiment of the valve 15' will now be described with reference to FIGS. 8 and 9.

The accelerated distribution opening or openings 14a can be implemented as in the embodiments previously described, with or without closeness to the deflection wall 10. The closure element 30 of the valve 15 here is kept in the closure position by one or more elastic return members 36a, 36b, so as to hermetically seal the auxiliary opening 24. Each elastic return member 36a, 36b is formed of plastic with shape memory and here is integrally connected to the transfer wall 3, on the annular face 28 at a location adjacent to the auxiliary opening 24.

To improve stability, it is preferred to use a pair of spiral elastic return members 36a, 36b which are arranged symmetrically on opposite sides of the auxiliary opening 24. The closure element 30 defines a non-deformable plate, and the elastic return members 36a, 36b are stretched toward the deflection wall 10, as can be clearly seen in FIG. 9, when the pressure of the flow F of untreated gas increases. A fixed rod (not shown) secured to the deflection wall 10 may optionally form an abutment to define a maximum away distance of the closure element 30. The surface S1, S2 defined by each of the elastic return members 36a, 36b is deformed in a spiral at a predetermined angle. This guides the loaded gas in a spiral on two opposite sides of the closure element 30. An elastic return member 36b may extend from the lower side in order to play a redirection role which prevents the downward gas flows from flowing directly beyond the edge 10c, and/or a lower baffle member 40 may lie immediately adjacent to the auxiliary opening 24 in order play a redirection role as well.

The arrows F2' indicate that the directions taken by the gas correspond to paths after impingement on the deflection wall 10, here with droplets 6 coming in contact with the nonwoven media 21 or similar fibrous material. A configuration with at least one baffle 40, preferably similar to the example illustrated in FIGS. 1 and 5, also enables obtaining droplets 6' by radial impingement on the baffle or baffles 40. A compact, stable configuration is thus obtained, enabling at least partial separation when bypassing the accelerated distribution openings 14a via the auxiliary opening 24. Here also, the one or more return members 36a, 36b, which extend further into the inner space V relative to the auxiliary opening 24, allow all or part of the closure element 30 to move closer to the impingement surface, typically planar, defined by the deflection wall 10.

Of course, the valve 15' may also lie at the same level as openings 14a, 14b, 14c, 14d and is not necessarily of reduced size relative to the closure element 30 shown in FIGS. 1 and 5. The embodiment with one or more baffles 40 is preferred, to prevent some of the gas from following a path without deflection by the surface 20 between the auxiliary opening 24 and the area with the channel 5 (see FIG. 2) which extends below the separation section 8.

In another embodiment (not shown) adapted for the case where multiple auxiliary bypass openings can be used, the transfer wall 3 comprises valve 15 and also at least one among valve 15' and a channel having a flow area which varies according to the pressure in the upstream area Z1. The channel of variable flow area is defined by an additional accelerated distribution channel, which preferably extends parallel to a central axis X of the auxiliary opening 24 (optionally in the stationary wall portion 12). The channel of variable flow area extends through the transfer wall 3 between a first end defining an access opening and a second deformable end (for example duckbill) which faces the deflection wall 10. The second deformable end allows defining a flow area which increases, due to deformation of the second end, when the flow rate F of the untreated gas increases in the inlet 2.

Regardless of the exact configuration of the closure system of the auxiliary opening 24, one will appreciate that the arrangement of the transfer wall 3 with an auxiliary opening 24 located farther away from the impingement surface than the accelerated distribution openings 14a, 14b, 14c, 14d allows incorporating auxiliary deflection surfaces, here formed by the baffle or baffles 40, 41, 42, which are advantageous for redirecting gas flows around a closure element 30 extending parallel to the deflection wall 10 and thus forming an obstacle (no possible short path of impingement in the impingement chamber without additional deflection in an area adjacent to the annular edge 30a). It is preferred to form the baffles 40, 41, 42 by projections protruding parallel to the general direction of flow permitted by the openings 14a, 14b, 14c, 14d and to the central axis X. These projections protrude at least from a nominal surface level where the auxiliary opening 24 opens into the inner space V.

One advantage of the invention is good adaptation to a wide range of flow rates for the untreated gas F without complicating the separation section 8, and enabling the separation of oil even in the bypass configuration that uses the auxiliary opening 24 of large flow area.

Another advantage of a separation device 1 according to the invention is that it can be placed in confined areas, typically in a cylinder head cover (having the advantage of being generally removable and detachable), for example in a constriction area or similar location outside the engine cover, so it is not subject to gushes or splattered oil. This results in fewer pressure peaks and better oil removal.

It should be obvious to those skilled in the art that the present invention allows embodiments in many other specific forms without departing from the scope of the invention as claimed. Thus, by way of example, the terms used to designate constituent elements of the separation section 8 may, as appropriate, correspond to one well-defined part or to an assembly of multiple parts.

The invention claimed is:

1. A separation device for purifying blow-by gas from a crankcase of an internal combustion engine, mountable between an inlet for loaded gas and a line for discharging purified gas, the separation device comprising:
   a separation section for separating oil from the blow-by gas, the separation section having each of:
      a transfer wall which includes a stationary wall portion having at least one accelerated distribution opening that allows the gas flowing in the inlet to pass through the transfer wall;
      a deflection wall having a planar oil guiding surface and positioned in an area of passage for at least one gas flow having passed through said at least one accelerated distribution opening, so that the deflection wall forms a gas-flow deflection wall;
      an auxiliary opening separate from the at least one accelerated distribution opening and made in the transfer wall;
      a valve; and
      a return member arranged behind the auxiliary opening, on the deflection wall side,
   wherein an impingement chamber is delimited between the transfer wall and the planar oil guiding surface of the deflection wall, the deflection wall including a housing of fixed guiding orientation, the housing directly opening in the impingement chamber through the planar oil guiding surface,
   wherein the valve has a rod received in the housing so that the valve moves linearly through the impingement chamber due to linear movement of the rod inside the housing,
   wherein the auxiliary opening is surrounded by a valve seat distal to the planar oil guiding surface, while the at least one accelerated distribution opening is formed in a projection distinct from the valve seat so as to extend closer to the planar oil guiding surface and be proximal to the planar oil guiding surface,
   wherein the valve has a movable closure element and is biased by the return member towards a closed position in which the closure element hermetically closes the auxiliary opening, the return member being configured to allow all or part of the closure element to approach the planar oil guiding surface in case of overpressure at the inlet side, and
   wherein the auxiliary opening defines a passage bypassing the accelerated distribution opening in case of overpressure at the inlet side.

2. The separation device according to claim 1, wherein the transfer wall provided with the housing directs, in a single general direction of flow, the loaded gas arriving through the inlet, the deflection wall extending crosswise to the single general direction of flow of loaded gas.

3. The separation device according to claim 1, wherein the separation section further comprises at least one outlet section on the deflection wall side, which opens into an oil discharge channel, the outlet section being defined by an end edge of the deflection wall which extends between two opposite and distanced ends of the deflection wall.

4. The separation device according to claim 1, wherein the transfer wall further comprises an accelerated distribution channel parallel to a central axis of the auxiliary opening, which extends through the transfer wall between a first end defining an access opening and a second deformable end facing the deflection wall, the second deformable end being adapted to define a flow area that increases in size due to deformation of said second end when the gas flow rate increases in the inlet.

5. The separation device according to claim 1, wherein at least one among the transfer wall and the deflection wall comprises attachment members distributed around the auxiliary opening and extending parallel to a central axis of the auxiliary opening, in order to maintain a predetermined spacing between the transfer wall and the deflection wall, at least one of the attachment members traversing a layer defined by a fibrous material.

6. The separation device according to claim 1,
   wherein the closure element is an unpierced element that has an annular outer edge, the unpierced element being in contact with the valve seat in the closed position, and
   wherein the annular outer edge in the closed position is spaced relative to the at least one accelerated distribution opening that faces away from the valve, so that gas flowing through the at least one accelerated distribution opening enters the impingement chamber away from the valve.

7. The separation device according to claim 6, wherein the separation section comprises at least one baffle extending at the periphery of the closure element so as to direct towards the deflection wall all or part of the flow of loaded gas passing between a boundary edge of the auxiliary opening and said annular outer edge in a position of the closure element that is distanced from the transfer wall.

8. The separation device according to claim 7, wherein said at least one baffle has a plurality of projections which protrude parallel to a central axis of the auxiliary opening.

9. The separation device according to claim 8, wherein the projections are configured in two sets, so as to define:
   first baffles radially closest to the annular outer edge; and
   second baffles radially furthest from the annular outer edge,
   the first baffles and the second baffles being arranged so as to alternate.

10. The separation device according to claim 6,
wherein the stationary wall portion is a portion of the transfer wall offset rearward relative to the auxiliary opening, so that the inner space defines an impingement chamber, and
wherein the closure element has a larger cross-section than the flow area defined by the auxiliary opening, in order to hermetically seal the auxiliary opening in a state where it bears against the valve seat, the valve seat being formed in an annular region bordering the auxiliary opening.

11. The separation device according to claim 1, wherein the return member is an elastic return member which extends to an elastic return member end positioned further rearward than the planar oil guiding surface, whereby the auxiliary opening is at a greater distance from the elastic return member end than from the planar oil guiding surface.

12. The separation device according to claim 11, wherein the deflection wall is in the form of an impingement plate, the valve being guided in translation through the impingement plate in the housing receiving one end of the return member, and the return member extending inside the impingement chamber and inside the housing.

13. The separation device according to claim 12, wherein the closure element is an unpierced planar element hermetically sealing the auxiliary opening in the closed position without covering any accelerated distribution opening of the transfer wall, the closure element extending parallel to the impingement plate, the stationary wall portion being a portion of the transfer wall offset rearward relative to the auxiliary opening so that the impingement plate is:
at a greater distance from the auxiliary opening,
and at a lower distance from the stationary wall portion.

14. The separation device according to claim 13,
wherein the stationary wall portion has a flat face close to the impingement plate, the flat face being a part of the projection, the at least one accelerated distribution opening comprising a plurality of accelerated distribution openings each arranged in the stationary wall and in communication with the impingement chamber at the flat face, and
wherein the plurality of accelerated distribution openings are each at a same close distance from the impingement plate, which is lower than distance between the auxiliary opening and the impingement plate.

15. The separation device according to claim 12, wherein at least one among the transfer wall and the deflection wall comprises attachment members distributed around the auxiliary opening and extending parallel to a central axis of the auxiliary opening, in order to maintain a predetermined spacing between the transfer wall and the deflection wall, at least one of the attachment members being a male member locked in a cavity of the impingement plate.

16. The separation device according to claim 1, wherein the deflection wall is in the form of an impingement plate, the return member extending inside the impingement chamber and inside the housing.

17. The separation device according to claim 16, wherein the deflection wall is covered with a coalescing media on the inner space side.

18. The separation device according to claim 16, wherein the deflection wall is covered with nonwoven media on the inner space side.

19. A separation device for purifying blow-by gas from a crankcase of an internal combustion engine, mountable between an inlet for loaded gas and a line for discharging purified gas, the separation device comprising:
a separation section for separating oil from the blow-by gas, the separation section having each of:
a transfer wall which includes a peripheral portion having at least one accelerated distribution opening that allows the gas flowing in the inlet to pass through the transfer wall;
a deflection wall having an oil guiding surface and positioned in an area of passage for at least one gas flow having passed through said at least one accelerated distribution opening, so that the deflection wall forms a gas-flow deflection wall;
an auxiliary opening separate from the accelerated distribution opening and made in the transfer wall;
a valve; and
a return member arranged behind the auxiliary opening, on the deflection wall side,
wherein the valve has a movable closure element and is biased by the return member towards a closed position in which the closure element hermetically closes the auxiliary opening, the return member being configured to allow all or part of the closure element to approach the oil guiding surface in case of overpressure at the inlet side, the peripheral portion partly surrounding the valve,
wherein the auxiliary opening defines a passage bypassing the accelerated distribution opening in case of overpressure at the inlet side, and
wherein the closure element bears against an inner annular face of the transfer wall, the peripheral portion being arranged at the end of a projection that protrudes toward the deflection wall from the inner annular face.

20. A separation device for purifying blow-by gas from a crankcase of an internal combustion engine, mountable between an inlet for loaded gas and a line for discharging purified gas, the separation device comprising:
a separation section for separating oil from the blow-by gas, the separation section having each of:
a transfer wall which includes a stationary wall portion having at least one accelerated distribution opening that allows the gas flowing in the inlet to pass through the transfer wall;
an auxiliary opening separate from the at least one accelerated distribution opening and made in the transfer wall;
a deflection wall having an oil guiding surface and positioned in an area of passage for at least one gas flow having passed through said at least one accelerated distribution opening, so that the deflection wall forms a gas-flow deflection wall;
a valve; and
a return member arranged behind the auxiliary opening, on the deflection wall side,
wherein an impingement chamber is delimited between the transfer wall and the oil guiding surface of the deflection wall, the deflection wall including a housing of fixed guiding orientation, the housing directly opening in the impingement chamber through the oil guiding surface,
wherein the valve has a rod received in the housing of fixed guiding orientation so that the valve is configured to move linearly through the impingement chamber due to linear movement of the rod inside the housing,
wherein the valve has a movable closure element integral with the rod and is biased by the return member towards a closed position in which the closure element hermetically closes the auxiliary opening, the return member being configured to allow all or part of the closure element to approach the planar oil guiding surface in case of overpressure at the inlet side,
wherein the closure element is an unpierced element that is in contact with a valve seat region included in the transfer wall in the closed position, the valve seat region surrounding the auxiliary opening,
wherein the valve seat region is distinct and spaced from the stationary wall portion, and
wherein the auxiliary opening defines a passage bypassing the accelerated distribution opening in case of overpressure at the inlet side.

\* \* \* \* \*